March 3, 1964 R. SEDLACEK 3,122,916
BRITTLE-MATERIALS TENSILE-STRENGTH TESTER
Filed April 27, 1962

RUDOLF SEDLACEK
INVENTOR.

BY Lyon+Lyon
ATTORNEYS

United States Patent Office 3,122,916
Patented Mar. 3, 1964

3,122,916
BRITTLE-MATERIALS TENSILE-STRENGTH
TESTER
Rudolf Sedlacek, Palo Alto, Calif., assignor to Stanford Research Institute, Palo Alto, Calif., a corporation of California
Filed Apr. 27, 1962, Ser. No. 190,735
5 Claims. (Cl. 73—97)

This invention relates to apparatus for testing the tensile strength of brittle materials and, more particularly, to an improvement therein.

The rapidly increasing need for utilizing refractory and corrosion-resistant materials in structural applications has increased the attention given to ceramics, hard metals, cermets, glass, etc. Thus it has become necessary to study the properties of these materials. Present techniques for studying the tensile properties of these materials, tensile pulling and flexure tests, or modifications thereof, were developed initially for metals, whose ductility permits the relief of parasitic clamping and misalignment stresses in the specimen. Such tests appear to be unsuitable for brittle materials, as is evidenced from published data wherein standard deviations from ten to fifty percent are the rule, rather than the exception, and disagreement between investigators often approaches one hundred percent. In many cases, these variations are the result of modifications in testing procedures and changes in the imposed stress gradients, rather than differences in the materials themselves.

Accordingly, it is an object of this invention to produce a reliable testing technique for brittle materials.

Another object of the present invention is the provision of an improved arrangement for reliably testing the tensile properties of brittle materials.

Yet another object of the present invention is the provision of an arrangement for permitting reproducible testing of brittle materials.

These and other objects of the invention may be achieved in an arrangement wherein a test specimen of the brittle material is made in the shape of a short cylinder. This test specimen is held in a specimen holder in a manner so that there is no force applied thereto. Hydrostatic pressure is then applied through an elastic envelope to the inside surface of the short cylinder, to cause it to expand. Pressure is applied in an amount desired to determine the strength of the brittle material.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
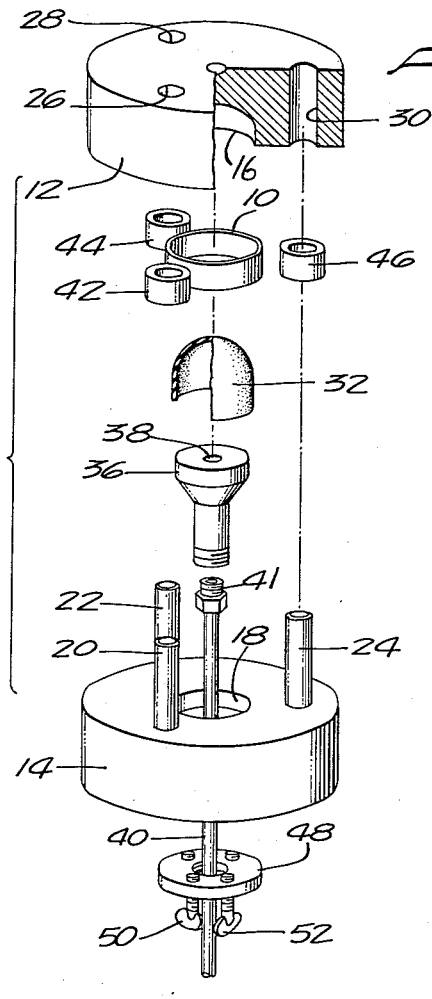
FIGURE 1 is an exploded view of the specimen holder and specimen.

Reference is now made to FIGURE 1, which is an exploded view of a specimen holder in accordance with this invention. A test specimen 10, which is to be held in the specimen holder for the purpose of tests, consists of a short cylinder which is formed from a brittle material to be tested. The specimen holder includes an upper, round steel plate 12 and a lower round steel plate 14. The upper round steel plate 12 has a cavity 16 machined therein, which is hemispherical in shape. The lower round steel plate has a cavity 18 machined therein, which is conical in shape. Both cavities have exactly the same maximum diameter. By way of illustration, but not to serve as a limitation, an embodiment of the invention which was constructed, the two round steel plates were six inches in diameter and two inches thick, and the maximum diameter of the cavities was 2.000 plus or minus 0.0005 inch.

Three dowel pins, respectively 20, 22, 24, are permanently mounted in the bottom plate. The top plate 12 has three openings, respectively 26, 28, 30, positioned to receive the three dowel pins when the upper and lower plates are brought in operative relation. The respective cavities 16, 18 face each other, and, together with the test specimen inserted between them, form a vessel against whose walls hydrostatic pressure is applied radially from the inside through a flexible, natural rubber bulb 32. The conical cavity 18 in the bottom plate opens to the outside and contains a steel plug 36, also having a conical shape, which is equipped with a narrow canal 38, through which the working fluid for providing the hydrostatic pressure enters the rubber bulb 32.

The open end of the bulb slips over the base of the conical plug 36, which is then positioned in the bottom cavity. The rubber is thereafter squeezed between the two steel parts, forming a leakproof seal. The outer end of the canal 38 is connected to a short, flexible pressure pipeline 40 which leads to a gauge manifold (not shown).

Exact position of the two opposed cavities 16, 18 is maintained by the dowel pins 20, 22, 24. In the assembled position, the two plates 14, 12 are separated by three symmetrically spaced steel spacer blocks, respectively 42, 44, 46, which are fitted over the respective dowel pins. These blocks are milled to an exact size on the order of 0.002 inch higher than the height of the test specimen. In this manner, a gap of 0.002 inch is provided, which allows the specimen to align itself with respect to the two confining steel plates. This gap should not be less than 0.001 inch in order to insure that the specimen is free to move without mechanical constraint.

Figure 2:
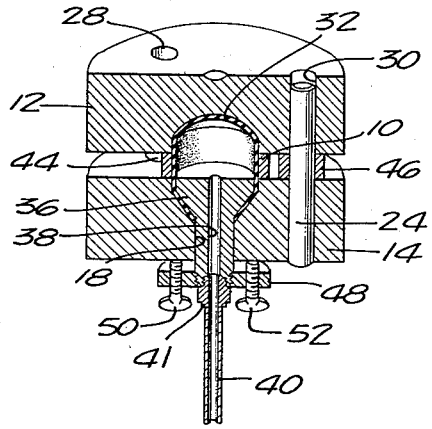
FIGURE 2 is a view in section of an assembled specimen holder.

FIGURE 2 is a cross section of the assembled specimen-holder. This shows the upper and lower blocks aligned with each other by means of the dowel pins and spaced properly from one another by means of the spacer blocks. The conical plug 36 presses down upon the ends of the rubber bulb 32, thus providing a seal against loss of hydraulic fluid. The end of the conical plug 36 is threaded to engage with the internal threads in a plate 48. This plate has a number of screws 50, 52, which are turned to press against the lower plate 14, and thus pull down on the conical plug and bring pressure to bear on the ends of the rubber bulb. The hydraulic line 40 is attached to the end of the conical plug by means of a suitable coupling fixture 41.

Figure 3:
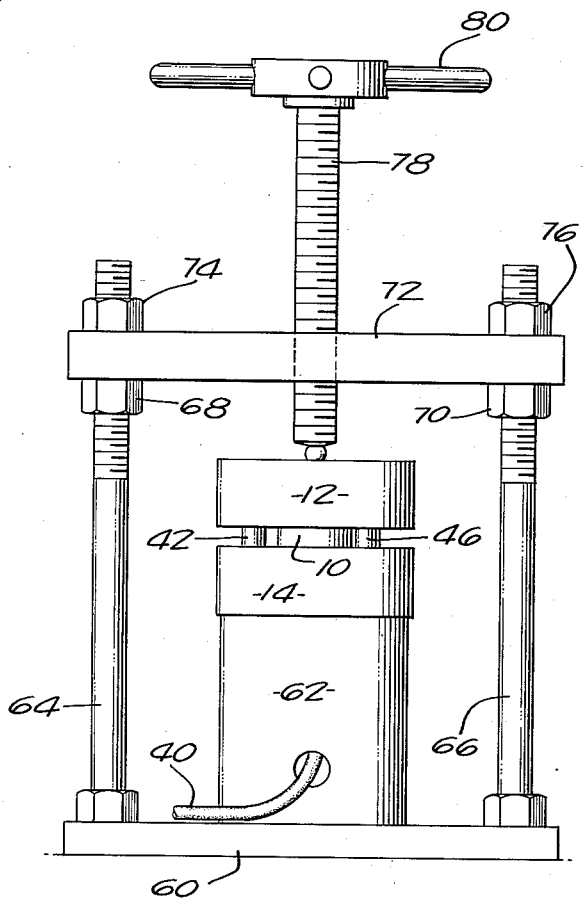
FIGURE 3 is a view showing the specimen holder positioned in a clamp for performing a tensile stress test.

FIGURE 3 shows the entire assembly being held in a steel pressure frame. Since the hydrostatic pressure applied to the bulb would push the confining plates apart, the entire assembly is clamped together in a steel frame, rigid enough to withstand the applied force and to maintain the proper width of gap between the specimen and the steel plates. The width of the gap is very critical because an increase of a few thousandths of an inch would allow the pressurized rubber bulb to flow into the gap and to tear. The steel pressure frame consists of the usual book-press type, including a base member 60, on which there is a support platform 62. Adjacent the support platform and on either side thereof are two upright pipe members 64, 66. These are permanently mounted to the base 60 and have the ends opposite to those mounted in the base threaded. A lower bolt 68, 70 engages the threads on the upper ends of the pipes 64, 66 to establish the level at which a crosspiece 72 will rest. The crosspiece is clamped in place by a pair of upper bolts 74, 76. The center of the crosspiece is threaded, and a screw member 78, having a wheel 80 mounted at its top end, is threaded through the crosspiece to engage the top one of the two plates to apply pressure thereto.

The proper measuring gauges (not shown) may be connected to the tube 40, to provide an indication of the pressure being applied to the test specimen 10.

It should be noted that it is preferable that the inside diameter of a test specimen match the inside diameter of the test-chamber cavities as closely as possible. Tests made, however, indicate that no significant error is introduced by minor diameter variations of less than a few mils. The actual operation of the system indicates that this method is extremely well suited to tensile-strength determinations on all materials of limited ductility, such as ceramics, cermets, refractory metals, glass, brittle plastics, etc. The test specimen is "free floating" during the test, that is, no stresses are introduced by mechanical constraints. The only stresses applied are those from the bulb 32. The test is simple and fast; no costly devices for alignment of specimens are needed. The experimental results show no dependence on wall thickness over the investigated range, and the simple symmetrical shape makes the sample fabrication easier than the fabrication of conventional tensile-test specimens.

The testing technique is basically a modified hoop-stress loading which takes advantage of two characteristic properties of hydrostatic pressure, the fact that the direction of pressure is always normal to the confining surface, and the fact that the pressure is perfectly uniform over the entire area of contact. The specimen employed in the test is a short, thin-walled cylinder, and the hydrostatic pressure applied to the inside surface of the cylinder by the elastic envelope causes the cylinder to expand and creates a tangential tensile stress in the walls. Thus, the tensile stress existing in the wall, corresponding to an internal hydrostatic pressure, may be easily calculated by well-known formulas. By utilizing this invention, it is possible to achieve other information besides the tensile strength, such as Young's modulus, shear strength, and Poisson's ratio.

There has accordingly been described and shown herein a novel, simple, and useful system for accurately testing brittle materials.

I claim:

1. Apparatus for testing a substantially cylindrically-shaped specimen of a brittle material having an inside wall defining a central aperture comprising an upper plate, a lower plate, means for aligning said upper and lower plates with said test specimen centrally disposed therebetween including a plurality of dowel pins mounted on the surface of said lower plate which is opposite a surface of said upper plate, and a separate aperture in said upper plate for receiving one end of a different one of said dowel pins, a separate spacer block mounted between said upper and lower plate over each of said dowel pins to maintain said upper and lower plates spaced apart by a predetermined amount without touching said specimen, means for pressing said upper and lower plates toward each other, and means occupying the center region between said upper and lower plate defined by said specimen central aperture for applying a measured amount of pressure uniformly and normal to the entire inside wall of said specimen.

2. Apparatus as recited in claim 1 wherein said means for applying a measured amount of pressure uniformly and normal to the entire inside wall of said specimen includes an elastic bulb, means for holding said elastic bulb positioned inside the central aperture of said cylindrically-shaped specimen, and means for applying fluid under pressure into said rubber bulb to cause it to expand against the inside wall of said specimen.

3. Apparatus as recited in claim 2 wherein said spacer blocks are dimensioned for preventing said upper and lower plates from pressing on said specimen, and for preventing said rubber bulb from being forced between said specimen and said plates.

4. Apparatus for testing a substantially cylindrically-shaped specimen of a brittle material having an inside wall defining a central aperture comprising an upper plate having a hemispherical cavity machined in one side thereof, a lower plate having a conical cavity machined inside thereof, with the apex of said conical cavity extending into an opening through to the other side of said lower plate, a plurality of dowel pins mounted on and extending from the side of said lower plate from which the base of said conical cavity extends, a plurality of apertures in said upper plate positioned for receiving said dowel pins, a plurality of spacer blocks mounted on said dowel pins for spacing said upper and lower plates a predetermined distance apart, said cylindrically-shaped specimen being positioned between said upper and lower plate and within the region between said spacer blocks, an elastic bulb having one end shaped to fill said hemispherical cavity and the other end open, means to hold said bulb in position within the central aperture of said cylindrically-shaped specimen comprising a conical-shaped plug adapted to fit within the open end of said bulb, means for holding said conical-shaped plug within said conical cavity with the ends of said bulb clamped between said conical-shaped plug and the walls in said lower plate defining said conical cavity, means for pressing said upper and lower plates toward each other, and means for applying hydraulic pressure to the interior of said bulb to cause it to expand against and apply pressure to the inside wall of said specimen.

5. Apparatus for testing a substantially cylindrically-shaped specimen of a brittle material having an inside wall defining a central aperture comprising an upper plate having a hemispherical cavity machined in one side thereof, a lower plate having a conical cavity machined inside thereof, with the apex of said conical cavity extending into an opening through to the other side of said lower plate, a plurality of dowel pins mounted on and extending from the side of said lower plate from which the base of said conical cavity extends, a plurality of apertures in said upper plate positioned for receiving said dowel pins, spacer block means positioned between said upper and lower plates for spacing said upper and lower plates a predetermined distance apart, said cylindrically-shaped specimen being positioned between said upper and lower plate and within the region between said spacer blocks, an elastic bulb having one end shaped to fill said hemispherical cavity and the other end open, means to hold said bulb in position within the central aperture of said cylindrically-shaped specimen comprising a conical-shaped plug adapted to fit within the open end of said bulb, means for holding said conical-shaped plug within said conical cavity with the ends of said bulb clamped between said conical-shaped plug and the walls in said lower plate defining said conical cavity, means for pressing said upper and lower plates toward each other, and means for applying hydraulic pressure to the interior of said bulb to cause it to expand against and apply pressure to the inside wall of said specimen.

References Cited in the file of this patent

UNITED STATES PATENTS

| | | |
|---|---|---|
| 756,644 | Johnson | Apr. 5, 1904 |
| 2,578,031 | Aubrey et al. | Dec. 11, 1951 |